May 9, 1939.  E. N. ANKETELL  2,157,157
OPTICAL APPARATUS
Filed Jan. 16, 1936  3 Sheets-Sheet 1

Fig.1ᴬ.

Inventor
Edward Norton Anketell.
By Jerry B. Morehouse
Attorney

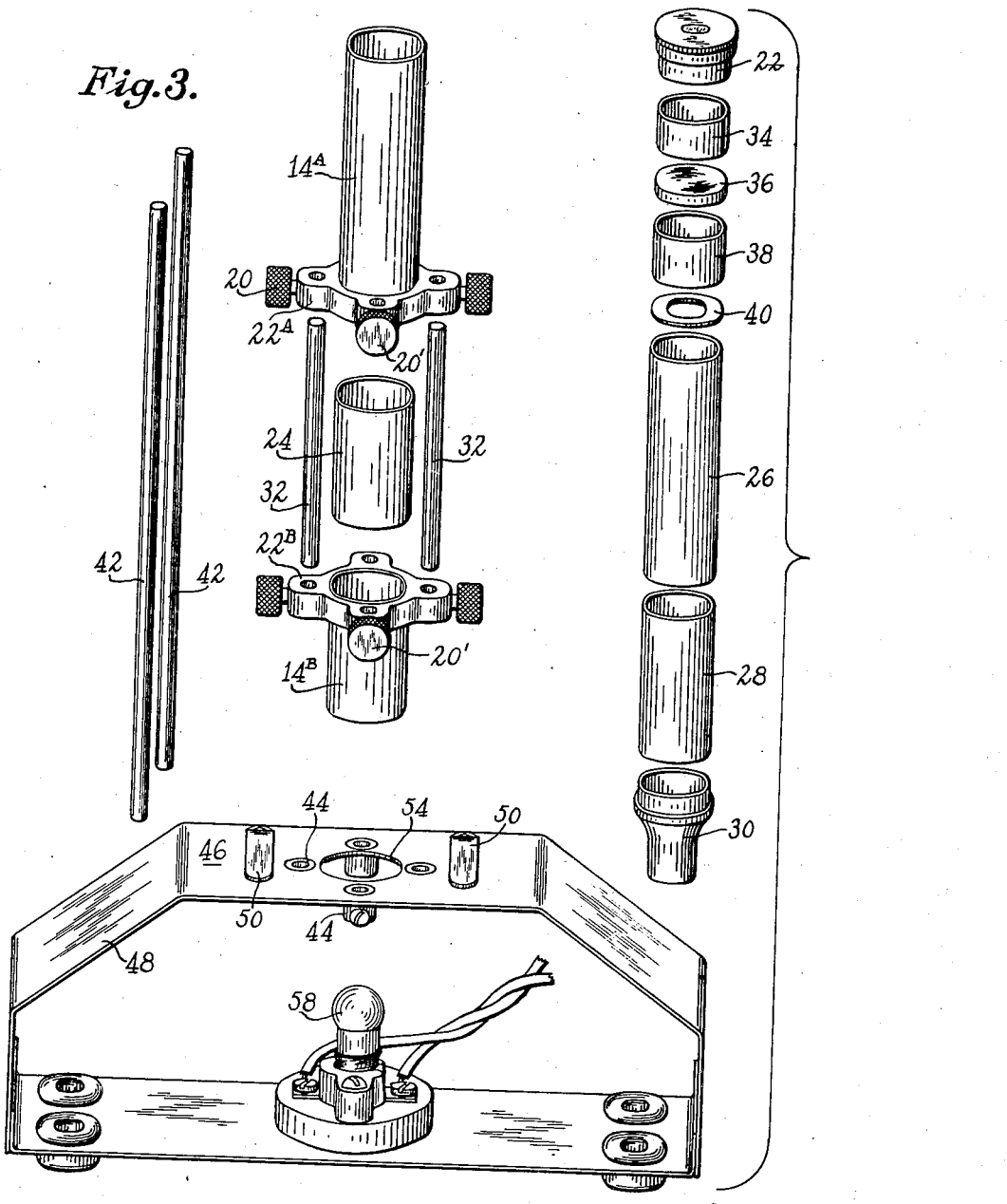

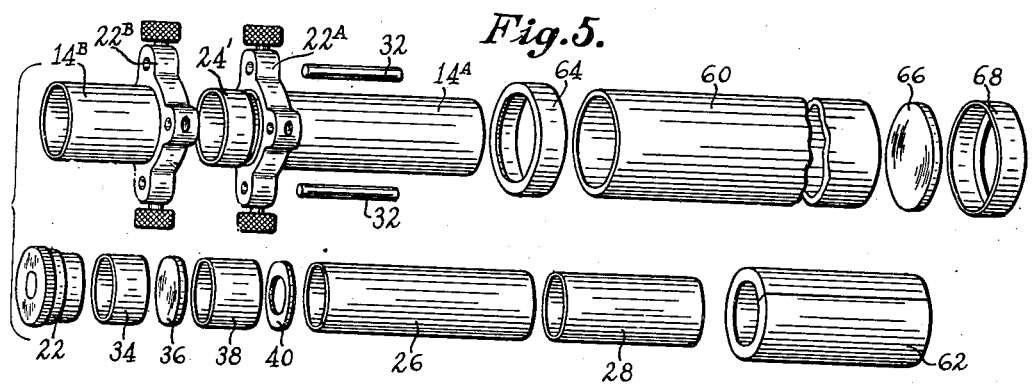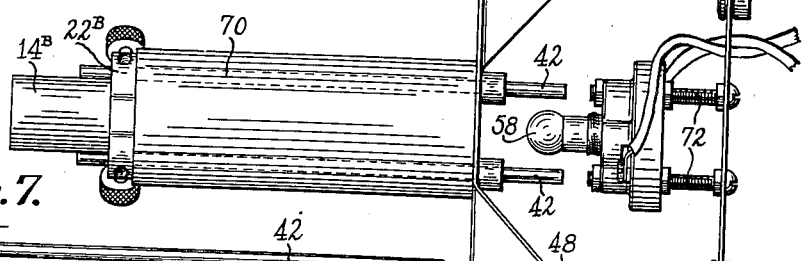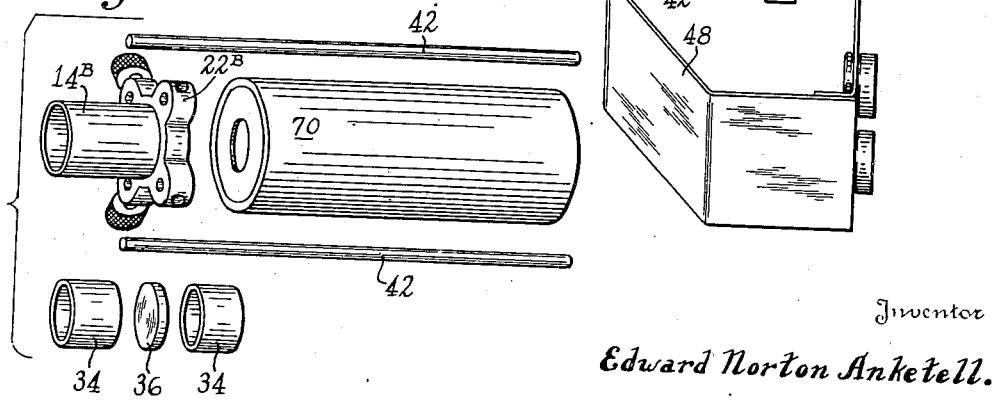

Patented May 9, 1939

2,157,157

UNITED STATES PATENT OFFICE 2,157,157

OPTICAL APPARATUS

Edward Norton Anketell, New Haven, Conn., assignor to The A. C. Gilbert Company, New Haven, Conn., a corporation of Maryland Application January 16, 1936, Serial No. 59,445

1 Claim. (Cl. 35—19)

This invention relates to optical apparatus or more particularly to apparatus of the type with which a plurality of different optical instruments may be built. Optical apparatus such as telescopes, microscopes, cameras, etc., are ordinarily too expensive to use extensively for play or educational purpose. Because of this it is frequently necessary for children either to forego entirely the luxury of having such equipment either for educational or play purpose or to confine themselves to a limited number of pieces.

It is the object of this invention to obviate the above impediment to a freer use of optical equipment. More particularly it is an object of this invention to provide optical equipment which may be used to produce alternately, telescopes, microscopes, projection apparatus, etc. It is a further object of this invention to obviate the necessity of possessing a large variety of complicated and expensive apparatus in order to study the principles of optics, telescopy, microscopy, etc. These and further objects of the invention will become more apparent from the following specification taken in connection with the appended claim and the accompanying drawings.

In accomplishing the objects of this invention there are provided in an outfit of optical apparatus a plurality of flanged couplings either separate or associated with lens tubes of various lengths.

These flange couplings provide a plurality of apertures for the reception of mounting rods and are provided with set screws of the thumb screw type for the ready adjustment of the lens barrels supported by the flange couplings. With a plurality of the lens barrels, supported by the flange couplings or between the said couplings, an optical tube of any size desired may be constructed readily. Adjustable elements of the tube may be interlocked to operate as a unit by coupling them through short mounting rods passing through and secured in each of the flange couplings it is desired to operate as a unit. Release of the thumb screws on either of the various coupled flange couplings permits movement of the unit relative to the other members of the combination.

Attention is now invited to the accompanying drawings which illustrate the invention and its application:

In the drawings, Figs. 1 and 1A represent respectively a cross section and top view respectively of a flange coupling constituting the fundamental element of the present invention.

Fig. 3 is a view of a compound microscope similar to that shown in Fig. 2 but with the elements "exploded" in order to clearly indicate the various members entering into the construction of the instrument.

Fig. 4 shows a telescope constructed in accordance with the present invention.

Fig. 5 is an "exploded" view of the telescope shown in Fig. 4.

Fig. 6 illustrates a projection kaleidoscope, and

Fig. 7 is an "exploded" view of the optical system of the kaleidoscope shown in Fig. 6.

Attention is now invited more particularly to the various figures of the drawings in which like parts are designated by the same reference character.

Figure 1:
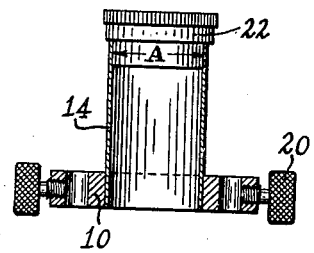

Figs. 1 and 1A show the flange coupling constituting the fundamental element of the present invention. This coupling, designated as 10, comprises a ring encircling a central aperture 12 in which is adapted to be fitted a lens barrel 14, shown in Fig. 1. The flange coupling is provided with a plurality of ears 16 in each of which is a hole 18 adapted to accommodate the mounting rods which will be described more particularly hereinafter. A set screw 20 of the thumb screw type is fitted in a tapped hole adjacent to each of the openings 18 for the purpose of securing the flange coupling to the mounting rods. The lens barrel 14 is forced into the central aperture in the flange coupling 10. The lens barrel 14 is slightly flared at A to provide a tapered fit for the accommodation of an eye piece or objective. An eye piece 22 is shown in Fig. 1 as inserted into the upper end of the lens barrel.

Figure 2:
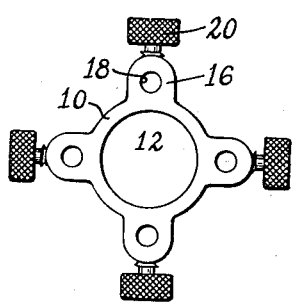
Fig. 2 is a perspective view of a compound microscope constructed by means of flange couplings comprising this invention.
Figure 2:
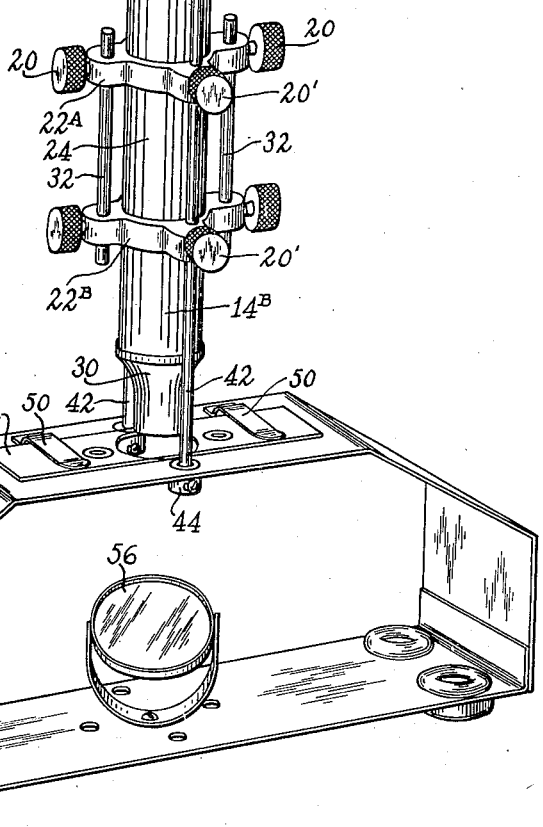

Attention is now invited to Figs. 2 and 3 which show a compound microscope. In Fig. 2 a microscope is shown completely assembled and in Fig. 3 the various elements of a similar microscope are shown "exploded" but placed in their approximate location. This telescope is composed of two flange couplings 22A and 22B having lens barrels 14A and 14B respectively. Between these two flange couplings is a lens barrel 24 held into position by means of the spacing tube 26 which is inserted inside of the lens barrel 14A and down into the lens barrel 24 and also by means of the spacing tube 28 which similarly extends into the lens barrel 14B and the lens barrel 24. The lens barrel 14A is equipped with an eye piece 22 and an objective lens 30 is fitted to the lens barrel 14B. The lens barrels are held in position relative to each other by means of the mounting rods 32, the upper ends of which clamp into the flange coupling 22A by means of the set screws 20 and the lower end of which are similarly clamped into the flange coupling 22B. The optical system of the telescope comprises the eye piece 22, a short spacing tube 34, a bi-convex collective lens 36, a second short spacing tube 38, a large hole diaphragm 40, the two spacing tubes 26 and 28 and the objective lens 30. The eye piece 22 and the objective lens 30 are secured to the upper and lower ends respectively of the combined optical tube, formed as above described, and the remaining elements of the system are inserted within the tube.

The optical system composed as above explained is mounted for vertical adjustment upon the long mounting rods 42 which are secured in suitable sockets 44 provided in the operating surface 46 of the dissecting stand 48. The mounting rods are secured in the sockets 44 by means of set screws so that they can be readily removed therefrom. Thus the operating surface 46, with the microscope removed, is not obstructed except for the spring clips 50 which are provided for the purpose of holding a microscope slide 52 in position over the aperture 54 of the operating table.

Illumination may be provided alternatively by means of a mirror 56 which is mounted for horizontal and vertical adjustment on the bottom portion of the dissecting stand 48 as shown in Fig. 2, or by means of a small electric light 58 rigidly mounted in the same position as shown in Fig. 3.

Adjustment of the microscope thus described is provided by releasing the set screws 20' to permit the entire optical system to be raised and lowered until it is in suitable focus relative to the object on the slide 52. When this adjustment is obtained the set screws 20' are tightened and the microscope will remain in focus.

A telescope may be made from the same parts that are used in the construction of the microscope as shown in Figs. 4 and 5 to which attention is now invited. The flange couplings 22A and 22B in which are secured the lens barrel 14A and 14B respectively are spaced from one another by means of the short lens barrel 24'. The flange couplings 22A and 22B are fastened together by means of the short mounting rods 32 which are secured by means of the thumb screws 20. The optical system is composed of the eye piece 22, spacing tube 34, bi-convex collective lens 36, spacing tube 38, large hole diaphragm 40, spacing tube 26 and spacing tube 28, all of which are mounted within the barrel composed of the separate lens barrels as above described. The telescope also includes the telescope tube 60 in one end of which is slidably mounted the optical system. A piece of felt 62 is inserted between the lens barrel 14A and the inner portion of the telescope tube 60 and a ferrule 64 is placed over the end of the telescope tube 60. An objective lens 66 is secured on the other end of the telescope tube 60 by means of a second ferrule 68 which holds it in position between an annular flange and the end of the telescope tube 60.

As a further example of the use of the flange coupling constituting the fundamental element of the present invention, there is illustrated in Figs. 6 and 7 a projection kaleidoscope which will now be described. A small kaleidoscope 70, of the usual type, which is well known and need not be here described, is mounted by means of two long mounting rods 42 which are secured in the sockets provided in the operating table of the dissecting stand 48 and in the flange coupling 22B in the latter of which is mounted the lens barrel 14B. In the lens barrel 14B is mounted the simple optical system comprising the spacing tubes 34 between which is held the bi-convex collective lens 36.

The kaleidoscope cell is illuminated by means of a lamp 58 which is mounted as shown upon screws 72 secured in the base of the dissecting stand 48. By means of this arrangement the kaleidoscope may be easily rotated and the image of the cell thereof will be projected by the lens 36 on a conveniently placed viewing surface, not shown.

Various other optical instruments may be constructed utilizing the flange coupling comprising this invention. The instruments above described have been shown for the purpose of illustration only and are not intended to limit the use to which the flange coupling may be put. Therefore, the invention shall be considered limited merely by the scope of the appended claim.

I claim:

A support permitting various adjustments of lens tubes and the like for purposes of demonstration, comprising a base having an upwardly spaced rod-holding portion, a pair of mounting rods detachably secured to said base and projecting upwardly therefrom in parallel relation, a pair of coupling members disposed in upwardly spaced relation to each other and held in place on and by said mounting rods, each of said members having a lens tube gripping opening and provided with laterally projecting perforated ears at the periphery spaced apart at 90°, the ears of one member being alined with those of the other, said mounting rods passing through alined ears and adjustably secured therein by set screws, and another pair of shorter mounting rods located and held in other opposite ears of the coupling members by set screws and adjustably interconnecting said members independently of said first named rods, said coupling members and said mounting rods in conjunction serving to support a lens tube extending through the openings of said members.

EDWARD NORTON ANKETELL.